No. 648,630. Patented May 1, 1900.
E. NESTER.
BACK PEDALING BRAKE.
(Application filed Dec. 16, 1899.)
(No Model.) 2 Sheets—Sheet 1.
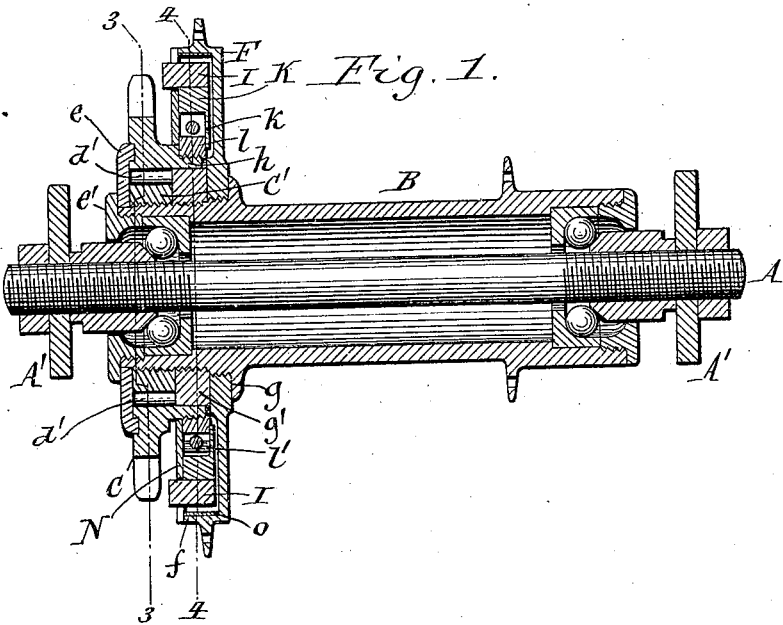
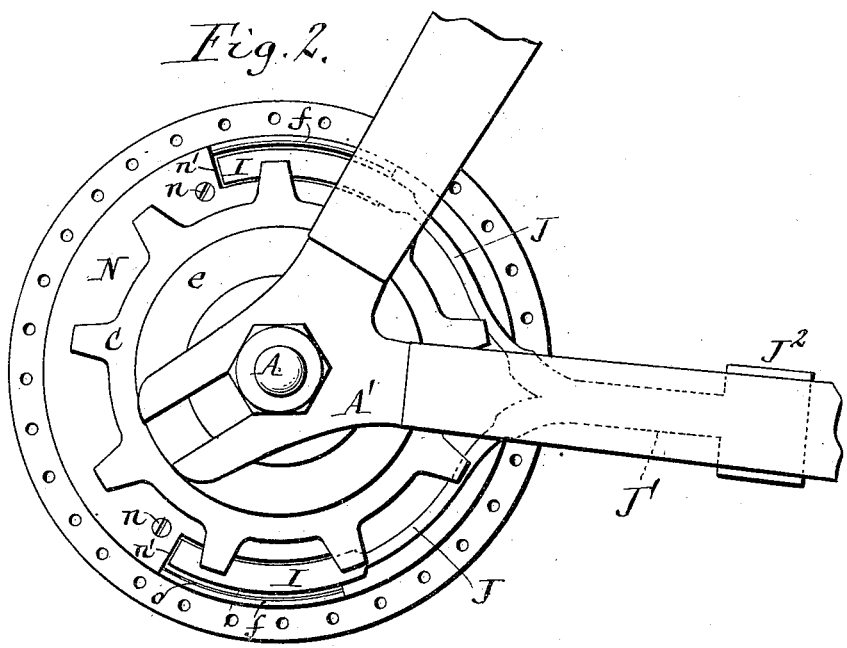
Witnesses:
E. A. Volk.
F. F. Scherzinger.
Edward Nester, Inventor.
By Wilhelm Bonner
Attorneys.

No. 648,630. Patented May 1, 1900.
E. NESTER.
BACK PEDALING BRAKE.
(Application filed Dec. 16, 1899.)
(No Model.) 2 Sheets—Sheet 2.
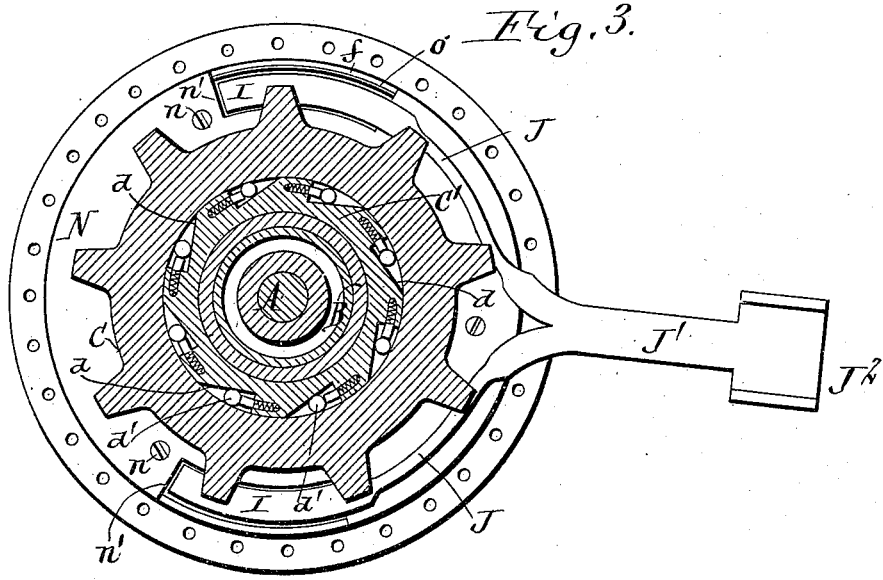
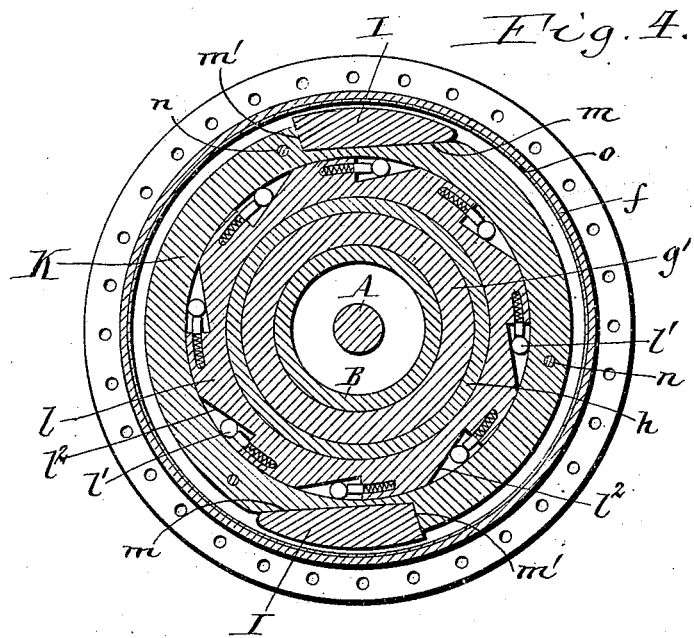
Witnesses:
E. A. Volk.
F. F. Schuzinger.
Edward Nester, Inventor.
By Wilhelm Bonner.
Attorneys.

UNITED STATES PATENT OFFICE.

EDWARD NESTER, OF BUFFALO, NEW YORK, ASSIGNOR OF ONE-HALF TO JOHN J. SCHNEIDER, OF SAME PLACE.

BACK-PEDALING BRAKE.

SPECIFICATION forming part of Letters Patent No. 648,630, dated May 1, 1900.

Application filed December 16, 1899. Serial No. 740,506. (No model.)

*To all whom it may concern:*

Be it known that I, EDWARD NESTER, a citizen of the United States, residing at Buffalo, in the county of Erie and State of New York, have invented new and useful Improvements in Back-Pedaling Brakes, of which the following is a specification.

This invention relates to that class of combined coasters and back-pedaling brakes which are applied to the hub of one of the wheels of a velocipede, such as the rear wheel of a bicycle.

The object of my invention is the provision of a reliable brake which can be effectively applied when necessary and which is practically noiseless.

In the accompanying drawings, consisting of two sheets, Figure 1 is a sectional elevation of a wheel-hub provided with my improved brake. Fig. 2 is a side elevation of the hub and the adjacent portion of the bicycle-frame. Figs. 3 and 4 are cross-sections in lines 3 3 and 4 4, Fig. 1, showing the reversely-operating driving and brake clutches.

Like letters of reference refer to like parts in the several figures.

A is the rear axle of a bicycle, which is rigidly secured in the slotted lugs of the rear fork A' in a well-known manner, and B is the wheel-hub, supported on the axle by ball-bearings of any suitable construction.

C is the driving wheel or member arranged at the end of the wheel-hub and consisting of a toothed rim, which is loosely supported on a ring or flange C', rigidly secured to the hub, preferably by a screw-thread, as shown. The driving-wheel C is connected with the wheel-hub by a clutch of any suitable construction, which compels the hub to turn forwardly with the wheel for propelling the machine, but allows the wheel to remain at rest in coasting or to turn backward independently of the hub for applying the brake. A roller-clutch of the construction shown in the drawings is preferably employed for this purpose, the same consisting of cam-faces $d$, formed in the periphery of the ring C', and rollers $d'$, interposed between said cam-faces and the inner face of the driving-wheel. These rollers are wedged between said cam-faces and the driving-wheel by the forward movement of the wheel for compelling the wheel and the hub to turn together forwardly, and the rollers recede into the deep rear portions of the recesses forming the cam-faces $d$ when the wheel is held stationary or turned backwardly, thereby allowing the hub to continue its forward movement independently of the driving-wheel.

The driving-wheel is retained upon the clutch-ring C' by a ring or washer $e$, which is applied to the end of the hub and overlaps the joint between the driving-wheel and the clutch-ring and which is in turn held in place by the dust-cap $e'$ of the adjacent ball-bearing.

F is a brake-disk rigidly secured to the hub on the inner side of the driving-wheel. In the construction shown in the drawings this disk is provided with a screw-threaded opening which engages with an external thread of the wheel-hub, and the disk is clamped between a flange or shoulder $g$ of the hub and a nut or filling-ring $g'$, surrounding the hub between the clutch-ring C' and the brake-disk F. This brake-disk is provided at its edge with an outwardly-extending annular flange $f$. The periphery of the filling-ring $g'$ is flush with that of the clutch-ring C', and the driving-wheel C is provided with a short inwardly-extending hub $h$, which surrounds said filling-ring.

I I represent curved brakes or brake-shoes arranged on the outer side of the disk F within its flange $f$ and adapted to bear against the inner face of said flange. These brake-shoes are arranged on opposite sides of the wheel-hub and are carried by elastic arms or springs J, which meet at their front ends in a shank J'. This shank is arranged on the inner side of the adjacent fork-arm of the velocipede-frame and is secured thereto by a clip J² or other suitable fastening. The springs J resist the outward movement of the brake-shoes and hold the same normally out of contact with the flange of the brake-disk F.

K is a shifting or actuating ring for the brake-shoes which is adapted to turn backwardly with the driving-wheel C in back-pedaling. This shifting-ring is connected with the driving-wheel by a clutch of any suitable construction which compels the ring to turn backwardly with said wheel, but allows the ring to remain at rest when the driving-wheel and hub turn forwardly. The clutch shown in the drawings for this purpose is similar to the driving-clutch heretofore described, but arranged to operate reversely to that clutch. $l$ is the clutch-ring of this brake-clutch, which is firmly secured to the hub of the driving-wheel, and $l'$ are the clutch-rollers interposed between the inner face of the shifting-ring K and the cam-faces $l^2$ of said clutch-ring. The shifting-ring K is provided at its inner edge with an inwardly-extending flange $k$, which overlaps the clutch-ring and keeps the clutch-rollers $l'$ out of contact with the brake-disk F. The shifting-ring is provided in its periphery with cams or cam-faces $m$, which bear against the inner faces of the brake-shoes I and trend in the proper direction to force the shoes outwardly against the surrounding flange of the brake-disk F when the shifting-ring is turned rearwardly in back-pedaling. The shifting-ring K is preferably provided with recesses $m'$, which receive the brake-shoes, and the bottoms of these recesses form the cams $m$ and are arranged at the necessary angle to the radius of the ring to produce a wedging or cam action when the ring is turned rearwardly. This ring, the clutch, ring $l$, rollers $l^2$, and the brake-shoes I are all arranged within the marginal flange of the brake-disk F, and these parts are covered and confined by a circular plate or cap N, which bears against the outer edge of said flange and the clutch-ring $l$ and is secured to the ring K by screws $n$ or other fastenings. The flanged brake-disk F and the cap N thus form a casing which incloses the above-mentioned parts. The cap N is provided in its edge with curved slots or notches $n'$, through which the brake-shoes extend.

The flange of the brake-disk F is preferably provided with an inner facing $o$, of vulcanized fiber or other suitable non-metallic material.

In the normal position of the parts the brake-shoes I are retracted by their springs J to the position shown in the drawings, in which they clear the flange of the brake-disk F. Upon driving the machine in the ordinary manner the wheel-hub B is caused to turn forwardly with the driving-wheel C by the main or driving clutch, while the brake-shoes and their shifting-ring K remain at rest. When it is desired to coast, the cranks are simply held stationary, when the driving-clutch permits the driving-chain or other intermediate power-transmitting device and the driving-wheel to remain at rest and the wheel-hub to continue its forward movement within the driving-wheel. Upon back-pedaling to apply the brake the shifting-ring K is turned backwardly with the driving-wheel C by the brake-clutch, causing its cams $m$ to force the brake-shoes against the flange of the brake-disk F and retarding or stopping the machine. Upon again pedaling forwardly the shifting-ring K is carried in the same direction by the friction of its clutch until it reaches its former position, thereby allowing the springs J to move the brake-shoes inwardly out of engagement with the flange of the brake-disk F.

By my improved construction the brake-shoes are caused to bear throughout their length against the brake-flange $f$ of the wheel-hub, thus rendering their entire face effective and producing a reliable brake which is prompt in action.

I claim as my invention—

1. The combination with a wheel-hub, a driving-wheel and a driving-clutch interposed between said members, of a brake-disk secured to said hub at the same end at which the driving-wheel is arranged and provided with an annular flange, brake-shoes arranged opposite the inner face of said brake-flange and connected with a stationary part of the velocipede, a rotary shifting-ring surrounding the hub of the driving-wheel and provided on its periphery with cams which operate against said brake-shoes, and a second clutch interposed between said driving-wheel and said shifting-ring and arranged reversely to the first-named clutch, substantially as set forth.

2. The combination with a wheel-hub, a driving-wheel, and a driving-clutch interposed between said members, of a brake-disk secured to said hub at the same end at which the driving-wheel is arranged and provided with an annular flange, brake-shoes arranged opposite the inner face of said brake-flange, spring-arms secured to the velocipede-frame and carrying said brake-shoes, an actuating device for applying said brake-shoes, and a second clutch interposed between said actuating device and said driving-wheel and arranged reversely to the first-named clutch, substantially as set forth.

3. The combination with a wheel-hub, a driving-wheel, and a driving-clutch interposed between said members, of a brake-disk secured to the hub at the same end at which the driving-wheel is arranged and provided with an outwardly-extending flange, brake-shoes arranged opposite the inner face of said brake-flange, spring-arms connecting said brake-shoes with the frame of the velocipede, an actuating device for applying the brake-shoes, a cap-plate secured to said actuating device and bearing against the edge of said brake-flange and provided in its periphery with recesses for the passage of said brake-shoes, and a second clutch interposed between said actuating device and said driving-wheel and arranged reversely to the first-named clutch, substantially as set forth.

Witness my hand this 8th day of December, 1899.

EDWARD NESTER.

Witnesses:
THEO. L. POPP,
JNO. J. BONNER.